United States Patent
Yang

(10) Patent No.: US 10,521,696 B2
(45) Date of Patent: Dec. 31, 2019

(54) CONVOLUTIONAL NEURAL NETWORK SYSTEM AND OPERATION METHOD THEREOF

(71) Applicant: SAMSUNG ELECTRONICS CO., LTD., Suwon-si (KR)

(72) Inventor: Seung-Soo Yang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 15/802,958

(22) Filed: Nov. 3, 2017

(65) Prior Publication Data

US 2018/0181838 A1 Jun. 28, 2018

(30) Foreign Application Priority Data

Dec. 22, 2016 (KR) .................... 10-2016-0177031

(51) Int. Cl.
| | |
|---|---|
| *G06K 9/00* | (2006.01) |
| *G06K 9/62* | (2006.01) |
| *G06N 3/04* | (2006.01) |
| *G06N 3/08* | (2006.01) |
| *G06K 9/46* | (2006.01) |

(52) U.S. Cl.
CPC ....... *G06K 9/6228* (2013.01); *G06K 9/00973* (2013.01); *G06K 9/4619* (2013.01); *G06K 9/627* (2013.01); *G06N 3/04* (2013.01); *G06N 3/0454* (2013.01); *G06N 3/08* (2013.01)

(58) Field of Classification Search
CPC combination set(s) only.
See application file for complete search history.

(56) References Cited

U.S. PATENT DOCUMENTS

| | | |
|---|---|---|
| 5,420,810 A | 5/1995 | Yamakawa et al. |
| 6,208,982 B1 | 3/2001 | Allen, Jr. et al. |
| 6,990,150 B2 | 1/2006 | Fang |
| 7,026,964 B2 | 4/2006 | Baldwin et al. |
| 7,979,844 B2 | 7/2011 | Srinivasan |
| 8,285,965 B2 | 10/2012 | Karr et al. |
| 8,738,845 B2 | 5/2014 | Patel et al. |
| 8,819,522 B2 | 8/2014 | Baba |
| 8,832,396 B2 | 9/2014 | Ohara et al. |
| 9,400,925 B2 | 7/2016 | Bourdev |

(Continued)

OTHER PUBLICATIONS

Nagi, Max-Pooling Convolutional Neural Networks for Vision-based Hand Gesture Recognition, 2011, IEEE International Conference on Signal and Image Processing Applications (Year: 2011).*

*Primary Examiner* — Alex Kok S Liew

(74) *Attorney, Agent, or Firm* — Sughrue Mion, PLLC

(57) ABSTRACT

An operation method of a convolutional neural network system includes executing convolution loops to determine a correlation between at least one kernel and an input feature map; determining a maximum position on the input feature map, the maximum position corresponding to a maximum value of an output feature produced based on the convolution loops; and processing first data of a first area of the input feature map through a convolution loop using the at least one kernel, the first area being associated with the maximum position. The processing of the first data includes skipping a convolution operation of second data of a second area of the input feature map, the second area being unassociated with the maximum position.

19 Claims, 11 Drawing Sheets

(56) References Cited

U.S. PATENT DOCUMENTS

| | | |
|---|---|---|
| 9,516,379 B2 | 12/2016 | Chen et al. |
| 2003/0215017 A1 | 11/2003 | Fang |
| 2004/0070616 A1 | 4/2004 | Hildebrandt et al. |
| 2005/0219085 A1 | 10/2005 | Baldwin et al. |
| 2007/0083467 A1 | 4/2007 | Lindahl et al. |
| 2007/0171453 A1* | 7/2007 | Tamaru ................ G03G 21/046 358/1.14 |
| 2007/0206682 A1 | 9/2007 | Hamilton et al. |
| 2009/0135309 A1 | 5/2009 | DeGeorge et al. |
| 2009/0157205 A1 | 6/2009 | Inoue et al. |
| 2009/0307660 A1 | 12/2009 | Srinivasan |
| 2011/0125977 A1 | 5/2011 | Karr et al. |
| 2011/0276859 A1 | 11/2011 | Baba |
| 2012/0002022 A1 | 1/2012 | Ohgose et al. |
| 2012/0011177 A1 | 1/2012 | Patel et al. |
| 2012/0158631 A1 | 6/2012 | Pitcher et al. |
| 2012/0230401 A1 | 9/2012 | Chen et al. |
| 2013/0138916 A1 | 5/2013 | Ohara et al. |
| 2014/0297988 A1 | 10/2014 | Ohyama et al. |
| 2015/0139485 A1 | 5/2015 | Bourdev |
| 2016/0162782 A1 | 6/2016 | Park |
| 2016/0171346 A1 | 6/2016 | Han et al. |
| 2016/0180195 A1 | 6/2016 | Martinson et al. |
| 2016/0259995 A1* | 9/2016 | Ishii ......................... G06K 9/46 |
| 2017/0357894 A1* | 12/2017 | Bainville ............. G06N 3/0454 |

* cited by examiner

CONVOLUTIONAL NEURAL NETWORK SYSTEM AND OPERATION METHOD THEREOF

CROSS-REFERENCE TO RELATED APPLICATION

This application claims priority from Korean Patent Application No. 10-2016-0177031, filed Dec. 22, 2016 in the Korean Intellectual Property Office, the entire contents of which are hereby incorporated by reference.

BACKGROUND

1. Field

Apparatuses and methods consistent with example embodiments relate to a neural network system, and more particularly, to a convolutional neural network system capable of reducing computing costs and power consumption, and an operation method thereof.

2. Description of the Related Art

Recently, a convolutional neural network (CNN) has been a deep neural network technique of choice for image recognition. The CNN has a plurality of convolution layers. Each convolution layer receives M input feature maps to produce N output feature maps, where M and N are natural numbers. The CNN performs down-sampling (or sub-sampling) for reducing a size of a feature map produced as a result of a plurality of convolution operations.

An operation that occupies substantially the most significant portion of the entire CNN process in terms of computational complexity is convolution. Compared with other operations of the CNN, a significant amount of power is consumed to perform the convolution operation, in which multiplication and accumulation operations are iterated. Accordingly, to implement hardware that performs the convolutional neural network CNN, there exists a need to reduce computational complexity of the convolution operation.

SUMMARY

One or more example embodiments provide a convolutional neural network system capable of reducing a convolution operation with the most computational complexity in a convolutional neural network system and an operation method thereof.

According to an aspect of an example embodiment, an operation method of a convolutional neural network system includes executing a plurality of convolution loops for computing a correlation between at least one kernel and an input feature map; determining a maximum position on the input feature map, the maximum position corresponding to a maximum value of an output feature produced based on the convolution loops; and processing first data of a first area of the input feature map through a convolution loop using the at least one kernel, the first area being associated with the maximum position. The processing the first data may include skipping a convolution operation of second data of a second area of the input feature map, the second area being unassociated with the maximum position.

According to an aspect of an another example embodiment, a convolutional neural network system may include an input buffer configured to buffer at least one of an input image and an input feature map; a processing element unit that performs a convolution operation using the at least one of the input image and the input feature map from the input buffer and at least one kernel; an output buffer configured to store output features that are output as a result of the convolution operation of the processing element unit; a controller configured to control the input buffer, the processing element unit, and the output buffer to execute convolution loops for processing the at least one of the input image and the input feature map, and detect a maximum position associated with a maximum value of the output features produced based on the convolution loops; and a maximum position buffer configured to store the maximum position.

According to an aspect of another example embodiment, a method includes determining a maximum position of an input feature map, wherein a position of the input feature map corresponding to a maximum value of an output feature produced via convolution loops converges to the maximum position; performing a convolution loop only on a first area of the input feature map corresponding to the maximum position to produce an output feature map, while skipping performance of the convolution loop over a second area of the input feature map that does not correspond to the maximum position; and storing the maximum position.

BRIEF DESCRIPTION OF THE FIGURES

The above and/or other aspects will become apparent and more readily appreciated from the following description with reference to the following figures, wherein like reference numerals refer to like parts throughout the various figures unless otherwise specified, and wherein.

DETAILED DESCRIPTION

In general, a convolution operation is performed to detect a correlation between two functions. The term "convolutional neural network" or "CNN" may refer to any process or system that determines a pattern of an image by performing the convolution operation with a kernel indicating a specific feature and repeating the convolution result.

Below, example embodiments will be described clearly and in detail with reference to accompanying drawings to such an extent that one of ordinary skill in the art may be able to implement them.

Figure 1:
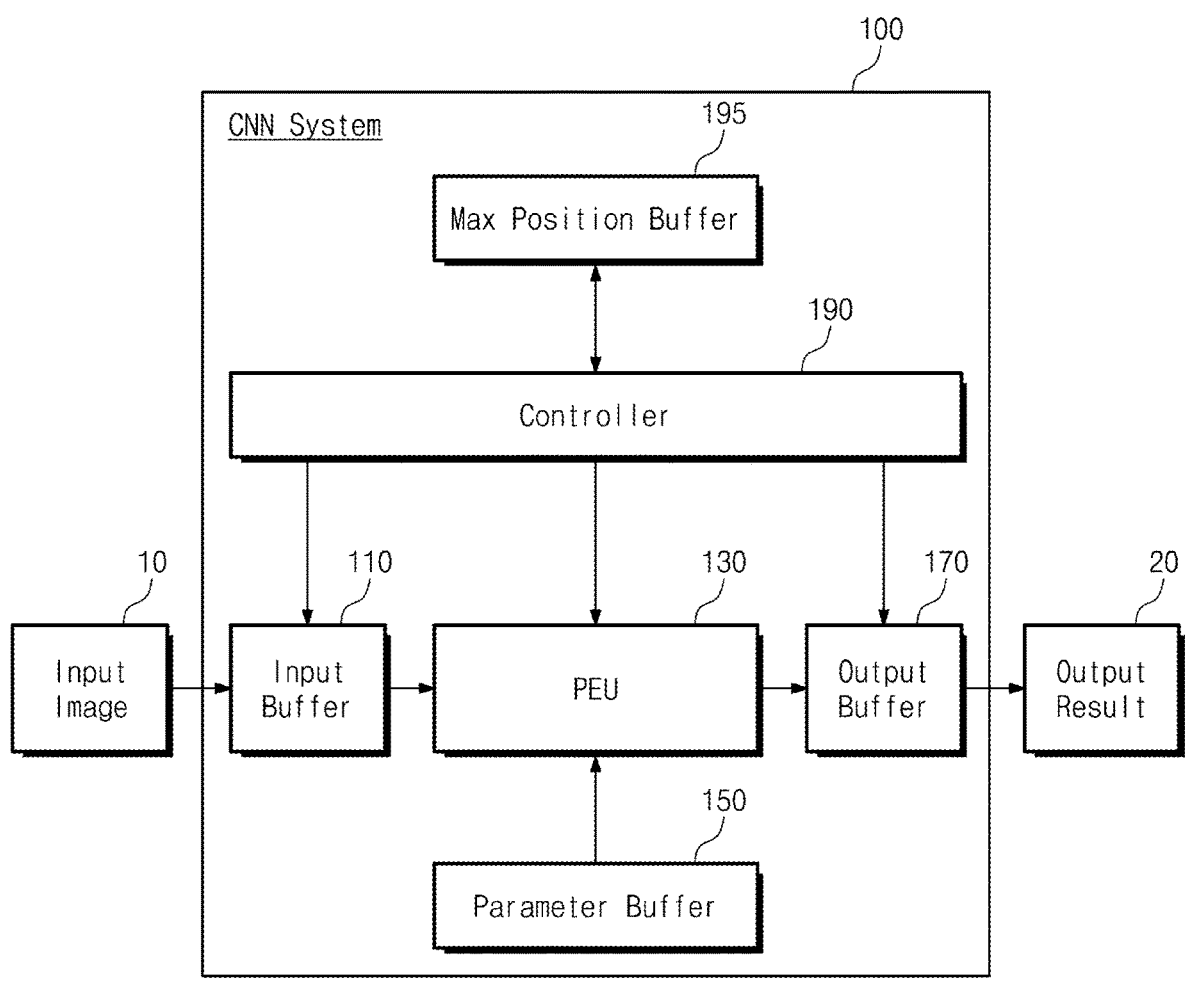
FIG. 1 is a block diagram illustrating a convolutional neural network system, according to an example embodiment.

FIG. 1 is a block diagram illustrating a convolutional neural network system, according to an example embodiment. Referring to FIG. 1, a convolutional neural network system 100 processes an input image 10 to generate an output result 20.

The input image 10 may be a still image or a video image provided through an image sensor. Alternatively, the input image 10 may be an image transmitted through a wired/wireless communication means. The input image 10 may refer to a two-dimensional array of digitized image data. The input image 10 may be a sample image provided for training of the convolutional neural network system 100. Although one image is provided as the input image 10, the amount of data that the one input image 10 contains may not be small.

The output result 20 may be a resultant value that is a processing result of the input image 10 by the convolutional neural network system 100. The output result 20 may be obtained as a result of determining an input image during a learning operation or estimation operation of the convolutional neural network system 100. The output result 20 may be a pattern or identification information that the convolutional neural network system 100 detects as being included in the input image 10.

The convolutional neural network system 100 may include an input buffer 110, a processing element unit (PEU) 130 (e.g., a processor), a parameter buffer 150, an output buffer 170, a controller 190, and a max position buffer 195.

Data values of the input image 10 may be loaded onto the input buffer 110. The size of the input buffer 110 may change with the size of a kernel for convolution. For example, in the case where the size of the kernel is "k×k," input data of the size enough for the processing element unit 130 to sequentially perform the convolution operation (or kernelling) with the kernel have to be loaded onto the input buffer 110. Loading of input data onto the input buffer 110 may be controlled by the controller 190.

The processing element unit 130 may perform the convolution operation or a pooling operation by using the input buffer 110, the parameter buffer 150, and the output buffer 170. The processing element unit 130 may perform, for example, the kernelling in which a process of multiplying the kernel and the input image 10 and a process of adding multiplied results may be iteratively performed. The processing element unit 130 may include parallel processing cores for processing a plurality of kernelling or pooling operations in parallel.

The kernel may be provided, for example, from the parameter buffer 150. Below, a process of multiplying all data of overlapping positions of the kernel and the input image 10 and adding the multiplication results is referred to as "kernelling". Each of the kernels may be regarded as a specific feature identifier. That is, in the case where one of the kernels is a filter for identifying a curve having a specific curvature, a large kernelling result value may be generated when a specific pattern of the input image 10 matches the specific curvature. The kernelling may be performed on the input image 10 and kernels that respectively correspond to various feature identifiers. A procedure in which the kernelling is performed by all kernels may be performed in a convolution layer, and a plurality of feature maps may be generated as a result value of the kernelling.

The processing element unit 130 may perform down-sampling on the feature maps generated by the convolution layer. Since the size of the feature maps generated by the convolution operation is relatively large, the processing element unit 130 may perform the pooling for the down-sampling to reduce the size of the feature maps. The result value of each kernelling or pooling operation may be stored in the output buffer 170 and may be updated whenever the number of convolution loops increases and whenever the pooling operation is performed.

Parameters that are needed for kernelling, bias addition, activation, pooling, etc. to be performed by the processing element unit 130 may be stored in the parameter buffer 150. Parameters learned in a learning step may be also stored in the parameter buffer 150.

A result value of the kernelling or pooling operation executed by the processing element unit 130 may be loaded onto the output buffer 170. The result value loaded onto the output buffer 170 may be updated according to an execution result of each convolution loop by a plurality of kernels. However, according to an example embodiment, if the maximum (max) data position is detected as the convolution loop progresses, the output buffer 170 may be controlled such that only buffer values corresponding to the detected specific position are updated.

The controller 190 may control the processing element unit 130 so as to perform the convolution operation and the pooling operation. The controller 190 may perform the convolution operation using the input image 10 or the feature map and the kernel. In the case of processing any one input image 10 through the convolution operation, a point in time when a position of the maximum feature value is not changed any longer at a specific depth or more may be detected. This time point is referred to as a "max position detection time point." After the max position detection time point, only an area that is predicted as the max value (i.e., maximum value) of the input image 10 exists may be processed through the convolution operation and the pooling operation. The controller 190 may store a position of the max value detected at the max position detection time point in the max position buffer 195. Afterwards, a position value of an image stored in the max position buffer 195 may be used to perform the convolution operation and the pooling operation of the input image 10.

With the above description, in the case where a position of the max value is detected during the convolution operation performed in the convolution layer, the following convolution loop may be applied to only data corresponding to the position of the max value of the input image 10 or the feature map. Accordingly, the convolution operation may not be performed any longer in an area of an image that is not associated with the position of the maximum value. In addition, it may be possible to skip a comparison operation in the pooling operation or bias addition for processing data included in the remaining area other than an area corresponding to the position of the maximum value.

Figure 2:
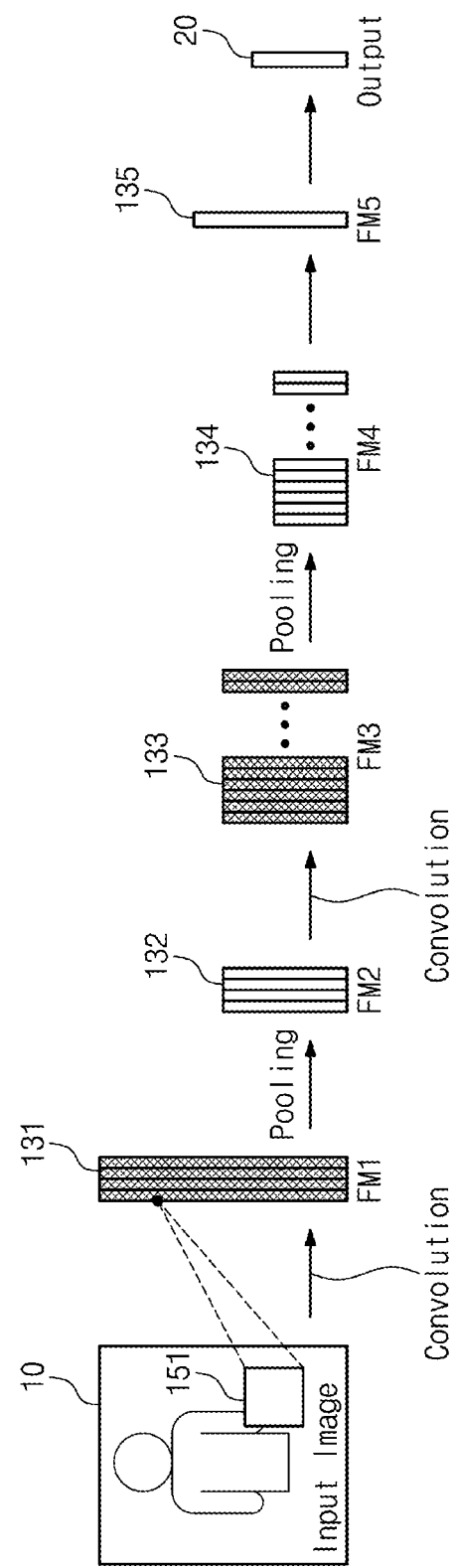
FIG. 2 is a view illustrating an operation that is performed in the convolutional neural network system of FIG. 1.

FIG. 2 is a view illustrating an operation that is performed in the convolutional neural network system of FIG. 1. Referring to FIG. 2, the input image 10 may be iteratively processed by the convolution layer and the pooling layer for down-sampling an execution result of the convolution layer. A bias addition or activation operation may be added between the convolution layer and the pooling layer.

If the input image 10 is provided, the convolution layer may be applied to the input image 10. For application of the convolution layer, the input image 10 may be processed by kernelling using a kernel. That is, data of the input image 10 overlapping a kernel 151 may be multiplied with a weighted value defined in the kernel 151. One feature value may be produced by summing all multiplied values. The kernelling may be iteratively performed while the kernel 151 is sequentially shifted. As such, a feature value corresponding to each position may be determined as the kernel 151 is shifted. The kernelling of the one input image 10 may be performed by using a plurality of kernels. A first feature map 131 of an array shape, which corresponds to each of the plurality of kernels, may be produced as the convolution layer is applied. For example, if four kernels are used, the first feature map 131 formed of four arrays may be produced. However, in the case where the input image 10 is a three-dimensional image, the number of feature maps may sharply increase, and a depth corresponding to the number of times of iterations of the convolution loop may also sharply increase.

Once the convolution layer is completely executed, the down-sampling may be performed on the first feature map 131. Data of the first feature map 131 may be produced with a size that may be too burdensome to process due to the number of kernels or the size of the input image 10. Accordingly, the down-sampling (or sub-sampling) for reducing the size of the first feature map 131 within a range, in which the down-sampling does not have a great influence on an operation result, is performed in the pooling layer. The pooling represents the down-sampling. The max value or an average value of the corresponding area may be selected while sliding, into the feature map 131, a filter for the down-sampling with a stride that is determined in advance. The case of selecting the max value is referred to as "max pooling," and a way to output the average value is referred to as "average pooling." A second feature map (FM2) 132 of a reduced size may be produced by the pooling layer based on the first feature map 131.

A third feature map 133 may be produced by performing the convolution operation on the second feature map 132. A fourth feature map 134 may be produced by the pooling layer based on the third feature map 133. FIG. 2 shows a set of the convolution layer and the pooling layer as being executed successively twice. However, embodiments are not be limited thereto. The number of times that the set of the convolution layer and the pooling layer is iteratively executed may vary according to system requirements. A fifth feature map 135 and the output result 20 may be produced according to the result of the above-described operation.

Multiplication and accumulation operations may be iterated to execute the convolution layer. With regard to the execution of the convolution layer, if a position of the max value is detected at a specific convolution depth, the following convolution operation may be executed only at the position of the max value of the input image 10 or a feature map. In addition, a process of adding a bias to the result value of the convolution operation may be applied to only the position at which the max value is detected. Accordingly, the convolution operation associated with a meaningless image area may be skipped. In addition, according to an example embodiment, a bias addition operation may be applied only to data of the position of the maximum value (e.g., selectively applied), and it is possible to skip a comparison operation in the pooling operation.

Figure 3:
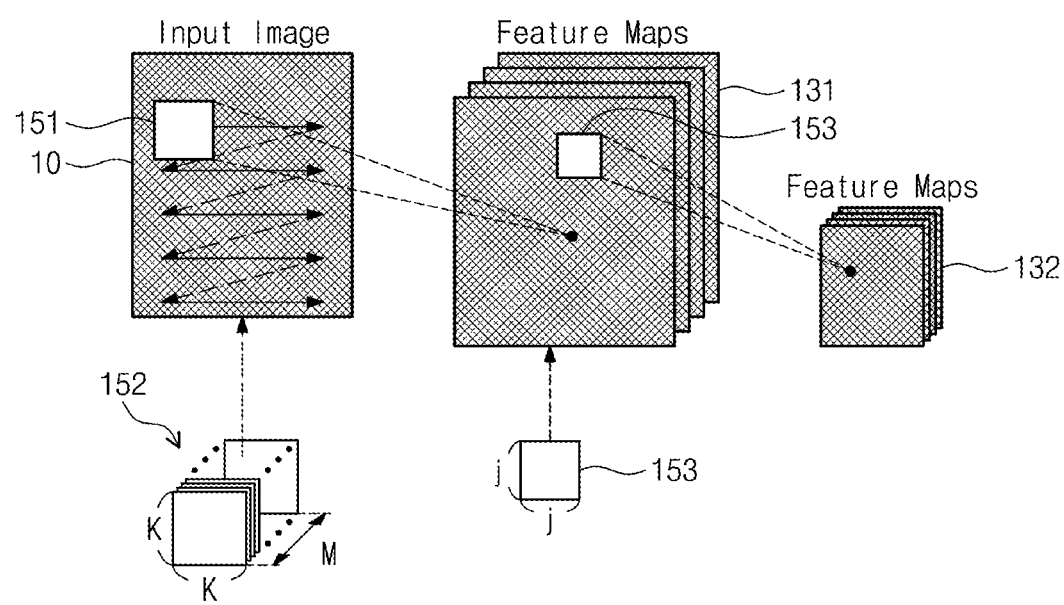
FIG. 3 is a view illustrating an operation of the convolution layer and the pooling layer.

FIG. 3 is a view illustrating an operation of the convolution layer and the pooling layer. Referring to FIG. 3, the first feature map 131 may be produced through the convolution operation by using the input image 10, and the first feature map 131 may be output as the second feature map 132 through the pooling operation.

The input image 10 may form the first feature maps 131 of an array shape by the kernelling with the kernel 151. A feature value of one point of the first feature map 131 may be produced by adding kernelled values of overlapping positions of the input image 10 and the kernel 151. If the kernelling is performed while shifting the kernel 151 with respect to all positions of the input image 10, one feature array may be produced. If the convolution operation is performed using all kernels (e.g., M kernels) 152, a plurality of feature map arrays (e.g., M map arrays) may be produced.

Here, the input image 10 processed through the convolution operation may be substantially divided into various components. For example, the one input image 10 may be divided into pieces of image data for expressing a color and a contrast associated with each RGB (red, green, blue) component. In addition, the input image 10 may be divided into pieces of data of which the sizes are changed. Below, a processing unit for performing the convolution operation on various image data by using all kernels (e.g., M kernels) 152 is referred to as a "convolution loop." The convolution loop may be executed by a plurality of depths of the input image 10. However, a feature map that is an accumulated value of result values of the convolution operation performed on one image may tend to have a position of the max value of the input image 10 or an input feature map become uniform if convolution loops are performed at a specific depth or more. Accordingly, if the convolution loops are performed until reaching a specific depth, a position of the max value may be fixed.

According to an aspect of an example embodiment, if it is determined that the max value of a feature is detected at a specific depth of the convolution operation, the following convolution operation may be performed only at a position of the input image 10 that corresponds to the max value. Accordingly, since the convolution operation of a meaningless (e.g., irrelevant) image area is skipped, computational complexity may be markedly reduced.

In addition, if stored position information of the max value is used for the pooling operation for down-sampling the first feature map 131, a feature of a fixed position may be returned to the output buffer 170 without comparing candidates of the maximum value. For example, if position information of the max value is used upon processing the first feature map 131 through a filter 153 for the pooling operation, there is no need to compare image data overlapping the filter 153. Only a feature that is selected with reference to the position of the max value is output. Accordingly, according to an aspect of an operation embodiment, if the position of the max value is used, computational complexity of the comparison operation to be performed during the pooling operation may be markedly reduced. In addition, a bias value allocated to a feature value that is determined by the convolution operation may be applied to only a feature of the position of the maximum value.

Figure 4:
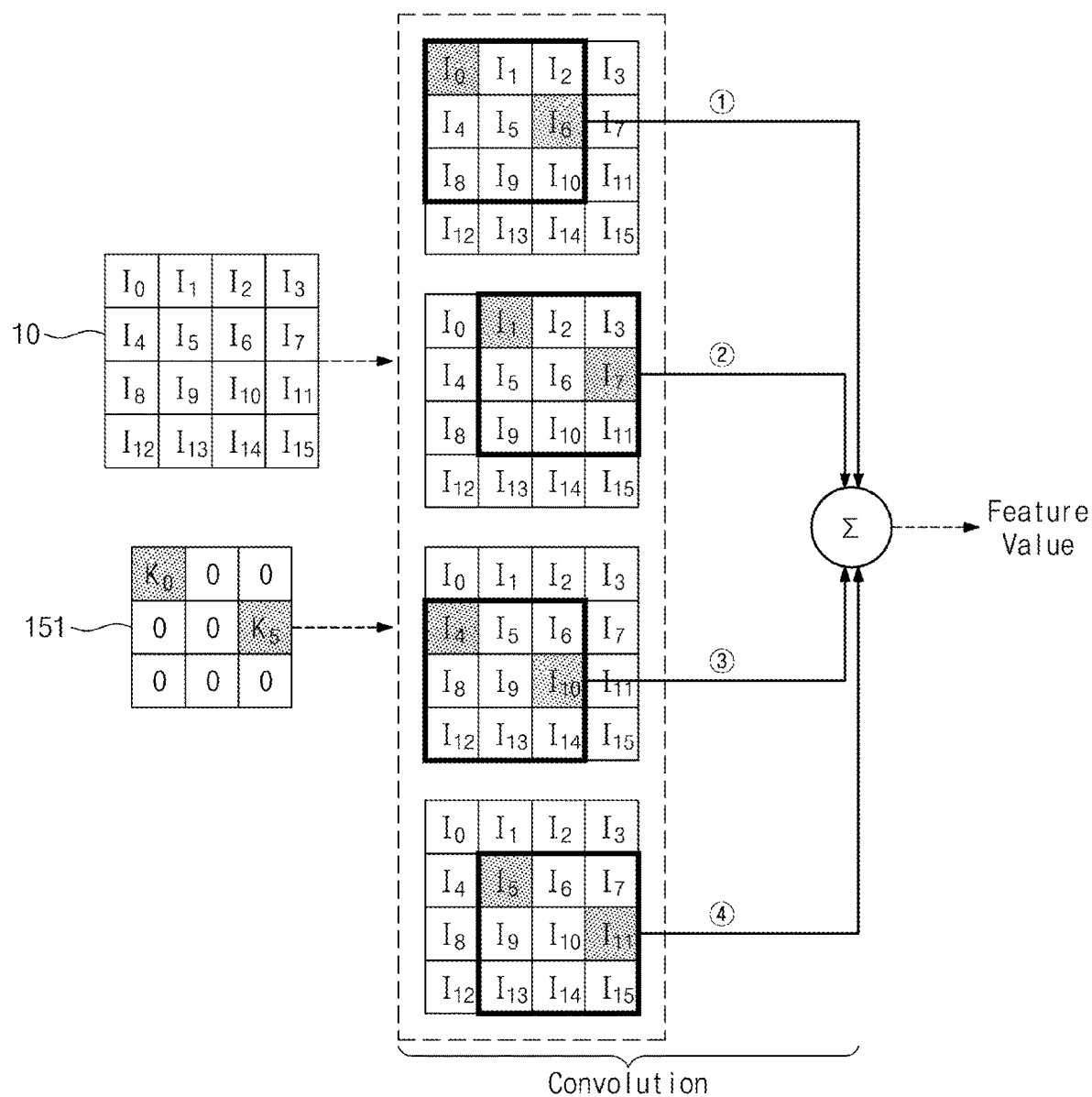
FIG. 4 is a view illustrating a characteristic of the convolution operation, according to an example embodiment.

FIG. 4 is a view illustrating a characteristic of the convolution operation, according to an example embodiment. Referring to FIG. 4, a feature value may be produced if the input image 10 and the kernel 151 are used.

It is assumed that the input image 10 is a 4-by-4 matrix of 16 image data $I_0$-$I_{15}$. It is assumed that the kernel 151 that is a feature identifier has 9 data points, "$K_0$, 0, 0, 0, 0, $K_5$, 0, 0, and 0" of a 3-by-3 size. If the kernelling of the input image 10 and the kernel 151 is performed, a partial sum of "$K_0 * I_0 + K_5 * I_6$" is produced by the kernelling operation ①. Partial sums of $(K_0 * I_1 + K_5 * I_7)$, $(K_0 * I_4 + K_5 * I_{10})$, and $(K_0 * I_5 +$ $K_5*I_{11}$) may be respectively produced by the kernelling operations ②, ③, and ④ in the same manner. If the partial sums are added, the feature value FV of "$K_0*(I_0+I_1+I_4+I_5)+K_5*(I_6+I_7+I_{10}+I_{11})$" may be output. The convolution operation is iterated until a preset depth is reached. However, if the controller 190 (refer to FIG. 1) according to an example embodiment determines that a position of the max value of feature values of the convolution operation is fixed, the controller 190 may store information about the position of the max value in the max position buffer 195. In the following convolution operation, the controller 190 may process only image data of a position stored in the max position buffer 195 by using the convolution operation.

Figure 5:
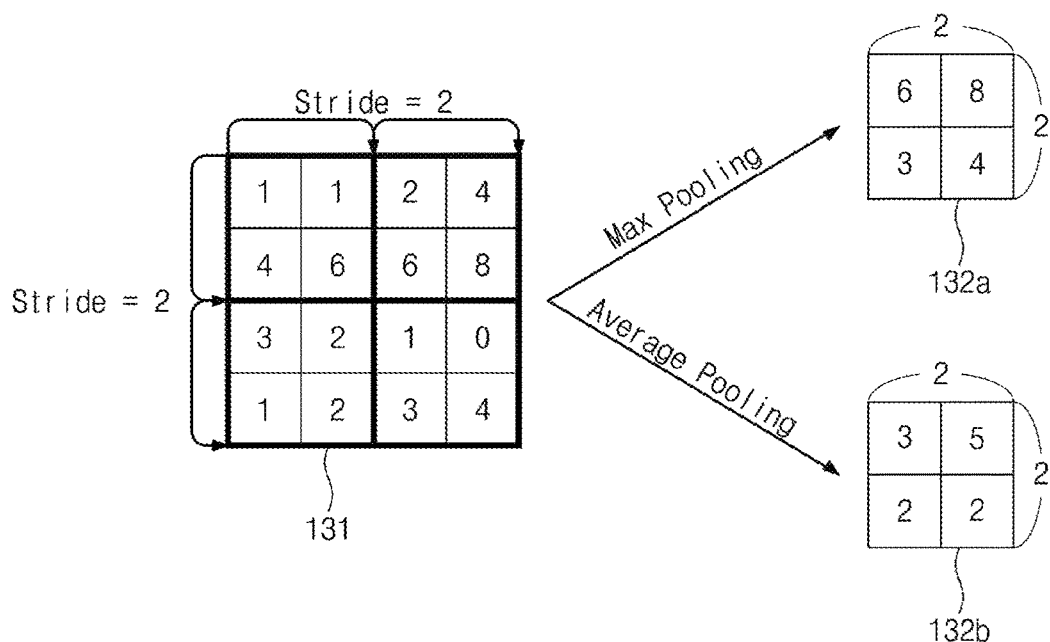
FIG. 5 is a view illustrating a down-sampling procedure, according to an example embodiment.

FIG. 5 is a view illustrating a down-sampling procedure, according to an example embodiment of. Referring to FIG. 5, max pooling and average pooling are briefly illustrated in a down-sampling manner.

Values of each matrix of the first feature map 131 may be values calculated by the above-described convolution operation of FIG. 4. The down-sampling may be performed while a window of a 2-by-2 size is shifted with a stride of 2. First, in the case of the max pooling (or maximum pooling), a down-sampling value 132a of a 2-by-2 size may be produced by selecting the maximum values of windows of the first feature map 131, each of which has a 2-by-2 size. The down-sampling value 132a may be output by selecting the maximum values 6, 8, 3, and 4 through the comparison operation on features of the windows of the first feature map 131, each of which has a 2-by-2 size.

In contrast, in the case of the average pooling, there are calculated average values of feature values included in the windows of the first feature map 131, each of which has a 2-by-2 size. The calculated average values may be output as a down-sampling value 132b of a 2-by-2 size. The down-sampling value 132b may be output by selecting average values 3, 5, 2, and 2 through the average operation on features of the windows of the first feature map 131, each of which has a 2-by-2 size.

Figure 6:
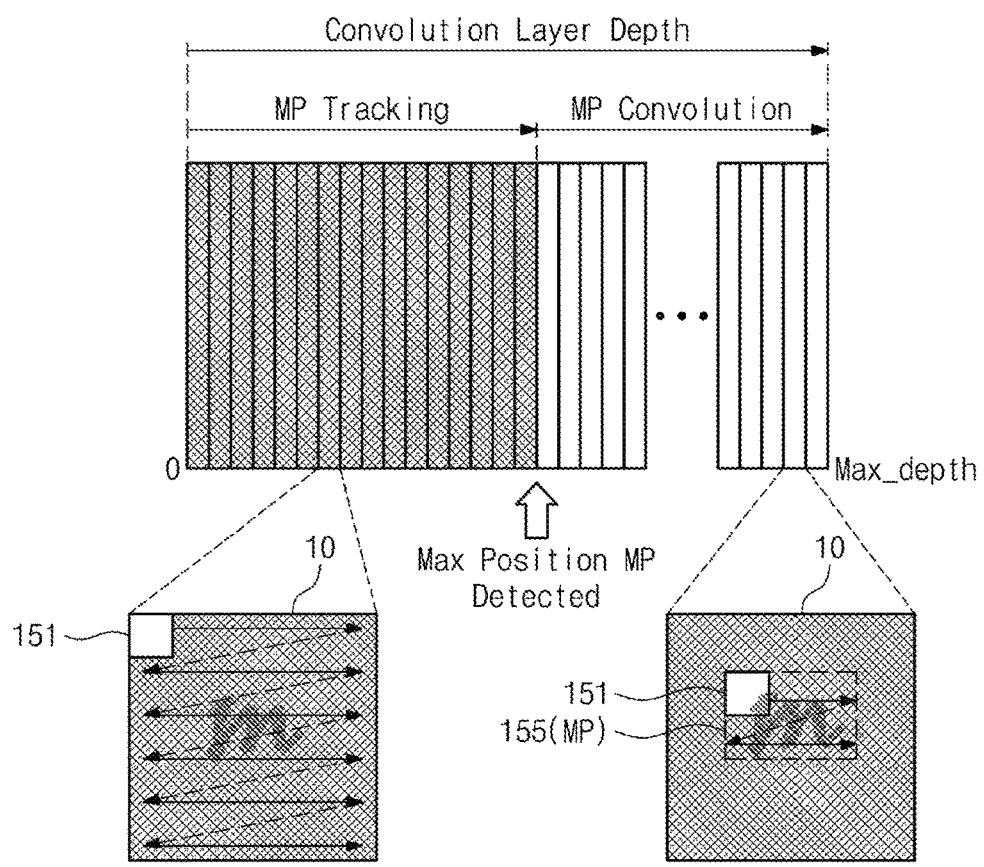
FIG. 6 is a view illustrating an operation in the convolution layer, according to an example embodiment.

FIG. 6 is a view illustrating an operation in the convolution layer, according to an example embodiment. Referring to FIG. 6, according to an example embodiment, characteristics of the convolution operation associated with depths in the convolution layer is briefly illustrated. According to an example embodiment, the convolution operation is performed until a depth at which a position of the max value is detected (MP Tracking). In the following convolution depth, the convolution operation may be applied to only a position of an image, at which the max value is detected.

The controller 190 may detect a position of the max value of features of the input image 10, which are accumulated according to a progress of a depth upon executing the convolution layer. As illustrated in FIG. 6, scanning and kernelling may be performed on data of the input image 10 through the kernel 151. The above-described convolution loop may continue until a position of the max value is detected. That is, convolution loops may be performed, and features that are result values of the convolution loops may be accumulated. The max value of feature values by the kernel 151 may start to appear from a specific convolution depth. For example, if a convolution loop of a depth progresses, a position of a feature value produced by kernels for detecting a letter "m" starts to be fixed. If the max value is detected at a specific position by a reference frequency or more, the controller 190 may determine that a max position MP is detected. The controller 190 may store max position data in the max position buffer 195.

The controller 190 may process only an area of a feature map or an image area, which the max position data indicate, through the convolution operation at a convolution depth after the max position MP is detected. If a position 155 corresponding to a position of the latter "m" is detected as the max position MP, the following convolution operation may be executed only at the max position MP. In this case, a meaningless convolution operation associated with the remaining area of the input image 10 other than the max position 155 may be skipped.

Figure 7:
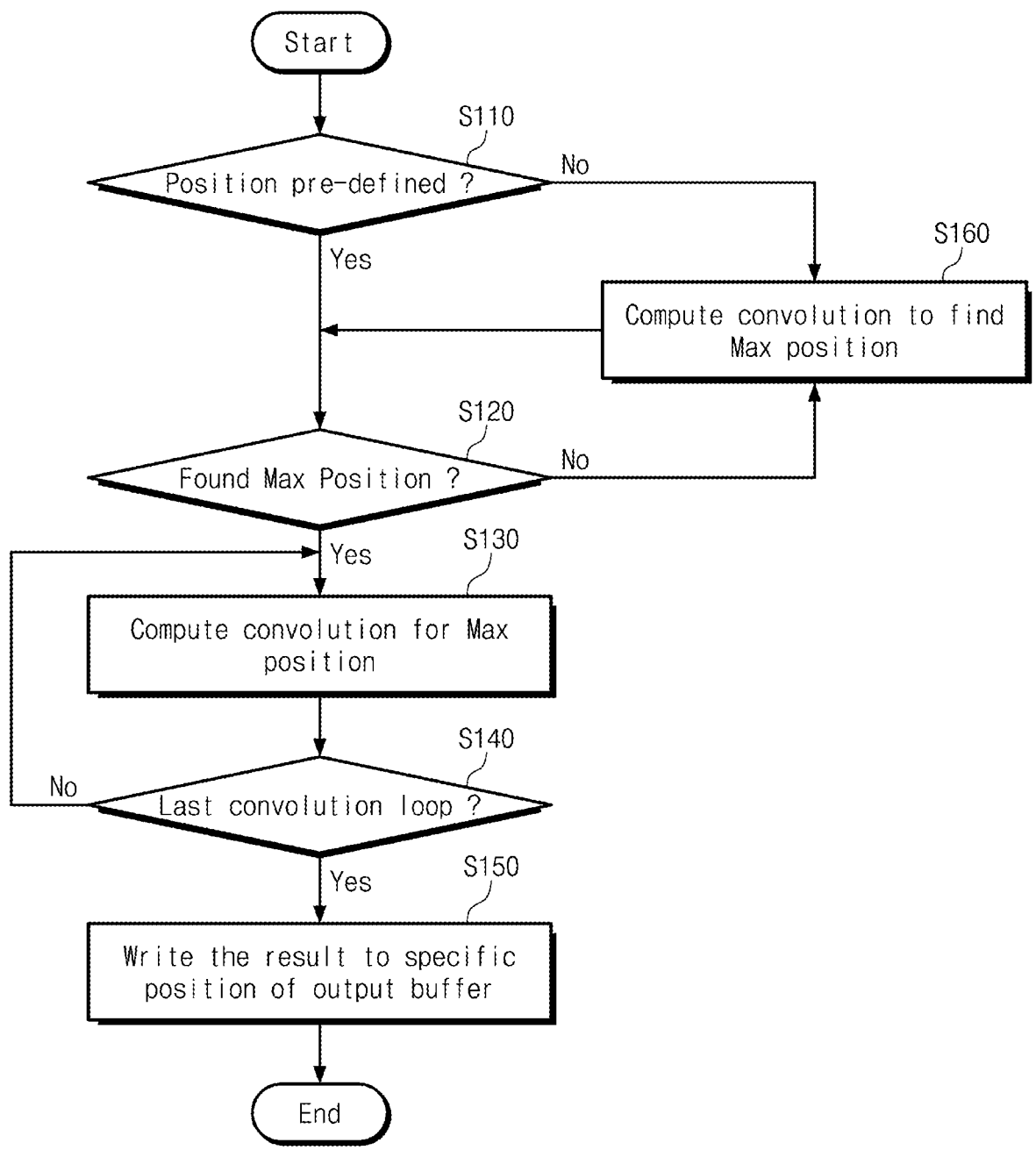
FIG. 7 is a flowchart illustrating a method of executing the convolution operation briefly described in FIG. 6, according to an example embodiment.

FIG. 7 is a flowchart illustrating a method of executing the convolution operation briefly described in FIG. 6, according to an example embodiment. Referring to FIG. 7, the controller 190 (refer to FIG. 1) may perform an operation for detecting a max position until a specific depth of the convolution operation is reached. If the max position is detected, the controller 190 stores max position data in the max position buffer 195. The max position may be stored in the max position buffer 195 in the form of probability information during a training operation of the convolutional neural network system 100. The following convolution operation may be performed based on the max position data stored in the max position buffer 195. This will be in more detail described below.

In operation S110, the controller 190 may determine whether a position to which the convolution operation will be applied is fixed (e.g., predefined). For example, for the convolution operation, a fixed position may be defined in the case where a specific position of an input image is fixed by a user (e.g., a position corresponding to the max value is input by a user) or max position data exists. If it is determined that the position of the input image (or a feature map), to which the convolution operation will be applied, is fixed (Yes), the process proceeds to operation S120. If it is determined that the position of the input image or the feature map, to which the convolution operation will be applied, is not set to a fixed value (No), the process proceeds to operation S160.

In operation S120, the control logic 190 may determine whether a max position is defined (e.g., fixed, detected). For example, the controller 190 may search the max position buffer 195 for the max position data and may determine whether the max position is detected. If it is determined that the max position is detected (Yes), the process proceeds to operation S130. If it is determined that the max position is not detected (No), the process proceeds to operation S160.

In operation S130, the controller 190 may control the input buffer 110, the processing element unit 130, the parameter buffer 150, and the output buffer 170 such that the convolution loop is executed based on the max position data stored in the max position buffer 195. The controller 190 may select data of an area corresponding to the max position from the input image 10 or the feature map and may perform the convolution operation on the selected data. The controller 190 may skip the convolution operation on the remaining area except for an area, which corresponds to a map position, of the input image 10 or a feature map.

In operation S140, the controller 190 may determine whether the convolution loop performed in operation S130 corresponds to the last depth or loop of the convolution layer. If the convolution loop performed in operation S130 does not correspond to the last loop of the convolution layer, the process proceeds to operation S130. If the convolution loop performed in operation S130 corresponds to the last loop of the convolution layer, the process proceeds to operation S150.

In operation S150, the controller 190 may copy features of the max position accumulated in the last convolution loop to the output buffer 170. In other words, the controller 190 may write the result to a specific position of the output buffer 170.

In operation S160, the controller 190 may control the input buffer 110, the processing element unit 130, the parameter buffer 150, and the output buffer 170 such that the convolution loop for determining the max position is executed. If the convolution loop for determining the max position is completely executed, the process proceeds to operation S120 for determining whether a max position of a previous convolution loop is the same as a max position of a currently executed convolution loop.

A method of detecting a max position of a feature value and a method of reducing computational complexity of the convolution operation by using information of the detected max position are described above with regard to one convolution layer. In addition, if the max position is detected, a technique of terminating an additional convolution operation may be applied if necessary.

Figure 8:
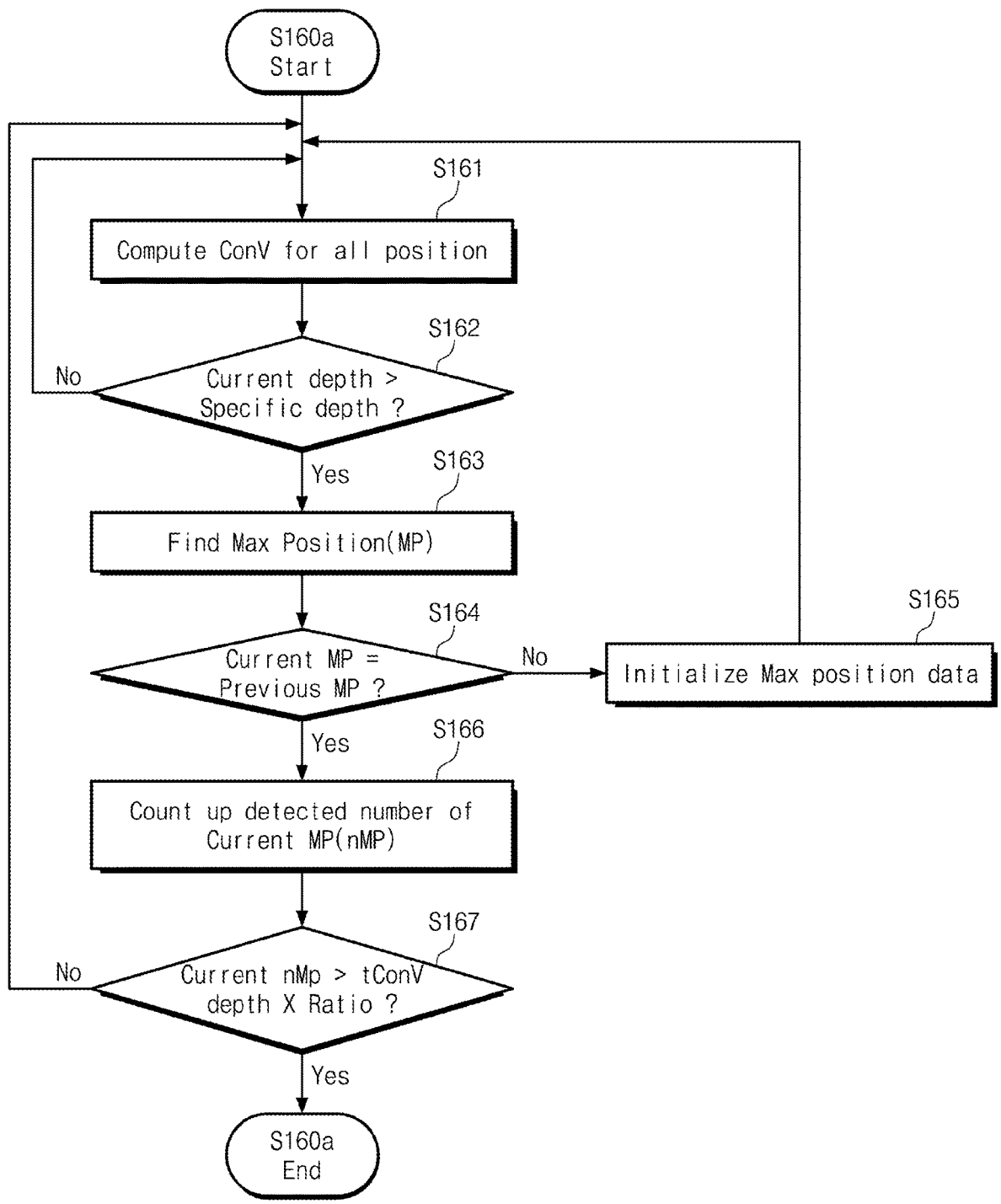
FIG. 8 is a flowchart illustrating an example of operation S160 performed in FIG. 7.

FIG. 8 is a flowchart illustrating an example of operation S160 performed in FIG. 7. An example embodiment (S160a) of a method of detecting a max position of a feature value will be described with reference to FIG. 8.

In operation S161, the controller 190 may control the input buffer 110, the processing element unit 130, the parameter buffer 150, and the output buffer 170 to execute the convolution loop for determining the max position. The processing element unit 130 may compute a correlation with a kernel by kernelling data of all positions of an input feature map or the input image 10. If the convolution loop is completed, an updated new feature map may be produced.

In operation S162, whether a current depth at which the convolution loop is executed is larger (e.g., deeper) than a specific depth (e.g., maximum depth) may be determined. The specific depth may be referred to as a maximum depth because it represents the maximum number of times the convolution loops are to be iterated. Here, the specific depth (e.g., maximum depth) may be set to a minimum depth at which a feature value accumulated by execution of the convolution loop is meaningful. If the current convolution depth is larger than the specific depth (Yes), the process proceeds to operation S163. If the current convolution depth is not larger than the specific depth (No), the process proceeds to operation S161.

In operation S163, the controller 190 may detect a max position MP from features (e.g., output features) of a feature map (e.g., output feature map) generated according to execution of the convolution loop of operation S161. Here, the max position MP may be a max value that is detected from among accumulated features (e.g., output features) generated according to the convolution operation in the one input image 10. Alternatively, the max position MP may be maximum values of accumulated features of respective area units divided in the one input image 10.

In operation S164, the controller 190 may compare the current maximum position Current MP detected in a current convolution loop and a previous maximum position Previous MP detected in a previous convolution loop. If the max position Current MP is the same as the max position Previous MP detected in the previous convolution loop (Yes), the process proceeds to operation S166. If the max position Current MP is different from the max position Previous MP (No), the process proceeds to operation S165.

In operation S165, the controller 190 may initialize max position data stored in the max position buffer 195. For example, the number of times that a max value is detected at the same position (i.e., one position) may be "0," and a previous max position may be updated. Afterwards, the process proceeds to operation S161, in which a convolution loop of a next depth for detecting a max position is executed.

In operation S166, the controller 190 may count up the number of times (also referred to as a "max value detection count" or "maximum value detection count") nMP that a max value is detected at a position where a max position is detected, in the max position buffer 195. That is, the controller 190 may update the number of times that a max value is detected at the same position in a current feature map. For example, "1" may be added to the max value detection count nMP managed in the form of a table in the max position buffer 195.

In operation S167, an operation branch may be made according to a relative ratio of the max value detection count nMP at the same position and the whole convolution depth (e.g., predefined maximum convolution depth). For example, in the case where a current max value detection count nMP exceeds a reference ratio (e.g., 10%) (also referred to as a preset ratio or a threshold ratio) at the whole convolution depth tConv depth, a max position may be determined as being fixed (e.g., detected, defined, converged). In other words, a max position may be where a position of the input feature map corresponding to a max value of an output feature, produced based on the plurality of convolution loops, converges. In this case, the relative ratio may be 10% or 0.1. The size of the relative ratio may be variously set according to a characteristic of the convolutional neural network system 100. If the ratio of the max value detection count nMP and the whole convolution depth at the same position may exceed a preset relative ratio (Yes), a max position may be determined as being fixed, and operation 160a ends. The fixed max position may be stored in the max position buffer 195. If the max value detection count nMP does not reach the relative ratio occupied at the whole convolution depth at the same position (No), the process proceeds to operation S161, in which a convolution loop for detecting an additional max position is executed.

An example embodiment for detecting a max position is described above. If the ratio of a successive max value detection count nMP and the whole convolution depth at the same position is larger than the preset relative ratio, a max position may be determined as being fixed. However, it may be well understood that whether a max position is fixed is determined based on the number of times nMP that a max value is discontinuously detected at the same position.

Figure 9:
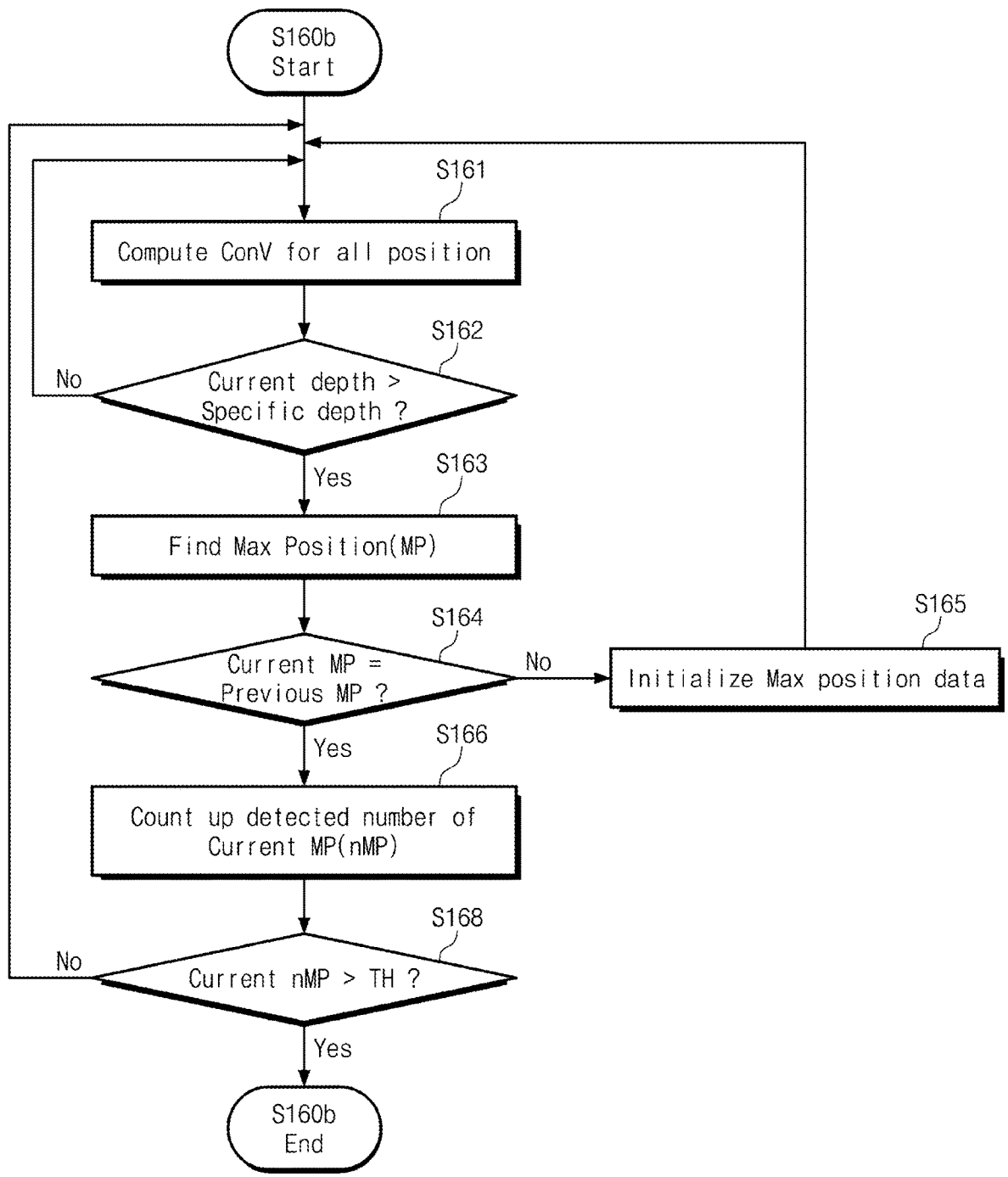
FIG. 9 is a flowchart illustrating another example embodiment of operation S160 performed in FIG. 7.

FIG. 9 is a flowchart illustrating another embodiment of operation S160 performed in FIG. 7. Another example embodiment (S160b) of a method of detecting a max position of a feature map will be described with reference to FIG. 9.

In operation S161, the controller 190 may control the input buffer 110, the processing element unit 130, the parameter buffer 150, and the output buffer 170 to execute the convolution loop for determining the max position. The processing element unit 130 may process data of all positions of an input feature map or the input image 10 through the convolution operation. A plurality of kernels may be used for the convolution operation, and thus, a plurality of feature maps may be produced. If a convolution loop for the convolution operation is completed, an updated new feature maps may be produced.

In operation S162, the controller 190 may determine whether a depth of the convolution loop performed in operation S161 is larger than a specific depth. Here, the specific depth may be set to a minimum depth at which features accumulated by execution of the convolution loop are meaningful. If the current convolution depth is larger than the specific depth (Yes), the process proceeds to operation S163. If the current convolution depth is not larger than the specific depth (No), the process proceeds to operation S161.

In operation S163, the controller 190 may detect a max value from accumulated features (e.g., output features) generated in the convolution loop of operation S161 and a max position MP at which the max value is detected. Here, the max position MP may be a max value that is detected from among accumulated features generated according to the convolution operation in the one input image 10. Alternatively, the max position MP may be maximum values of accumulated features of respective area units divided in the one input image 10.

In operation S164, the controller 190 may compare the max position Current MP detected in a current convolution loop and a max position Previous MP detected in a previous convolution loop. If the max position Current MP is the same as the max position Previous MP detected in the previous convolution loop (Yes), the process proceeds to operation S166. If the max position Current MP is different from the max position Previous MP (No), the process proceeds to operation S165.

In operation S165, the controller 190 may initialize max position data stored in the max position buffer 195. For example, the number of times that a max value is detected at the same position may be "0," and a previous max position may be updated. Afterwards, the process proceeds to operation S161, in which a convolution loop of a next depth for detecting a max position is executed.

In operation S166, the controller 190 may count up the number of times nMP that a max value is detected at a detected position, in the max position buffer 195. That is, the controller 190 may update the number of times that a max value is detected at the same position in a current feature map. For example, "1" may be added to a max value detection count nMP managed in the form of a table in the max position buffer 195.

In operation S168, an operation branch may be made according to whether a max value detection count nMP at the same position exceeds a threshold value TH. For example, if a current max value detection count nMP exceeds the threshold value TH, the controller 190 may determine that a max position is fixed. The size of the threshold value TH may be variously set according to a characteristic of the convolutional neural network system 100. If the max value detection count nMP at the same position exceeds the threshold value TH (Yes), the max position may be determined as being fixed, and operation S160b ends. The fixed max position may be stored in the max position buffer 195. If the max value detection count nMP at the same position does not reach the threshold value TH (No), the process proceeds to operation S161, in which a convolution loop for detecting an additional max position may be executed.

Another example embodiment for detecting a max position is described above. If the max value detection count nMP at the same position is larger than the threshold value TH, it may be determined that a max position is detected. However, it may be well understood that whether a max position is fixed is determined based on the max value detection count nMP discontinuously detected at the same position.

Figure 10:
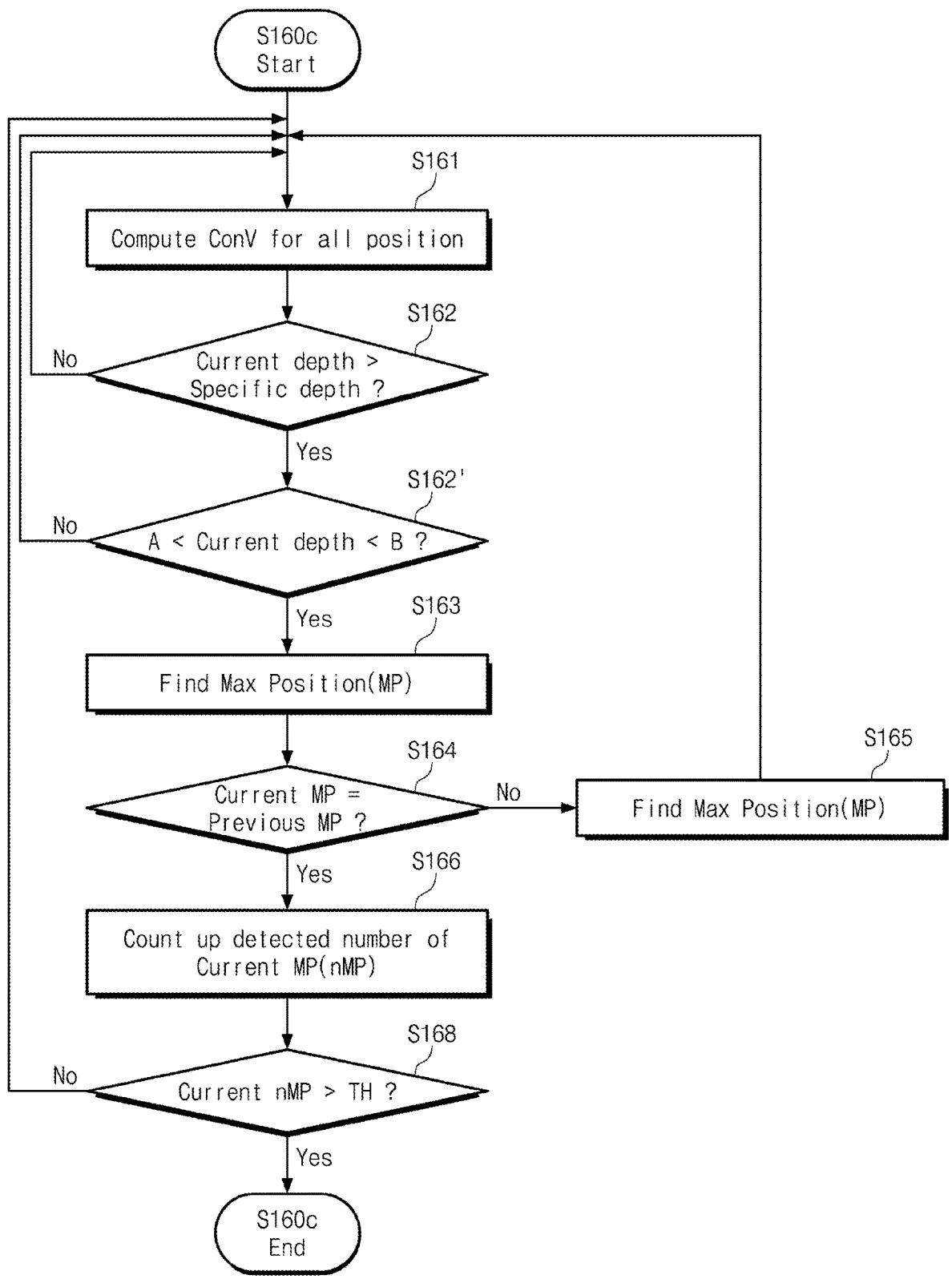
FIG. 10 is a flowchart illustrating another example embodiment of a method of detecting a max position, which is performed in FIG. 7.

FIG. 10 is a flowchart illustrating another example embodiment of a method of detecting a max position, which is performed in FIG. 7. Referring to FIG. 10, a max position of a feature map may be detected in a specific depth interval from "A" to "B." The example embodiment will be briefly described using operation S160c.

In operation S161, the controller 190 may control the input buffer 110, the processing element unit 130, the parameter buffer 150, and the output buffer 170 to execute the convolution loop for determining the max position. The processing element unit 130 may process data of all positions of an input feature map or the input image 10 through the convolution operation. A plurality of kernels may be used for the convolution operation, and thus, a plurality of feature maps may be produced. If a convolution loop for the convolution operation is completed, an updated new feature maps may be produced.

In operation S162, the controller 190 may determine whether a depth of the convolution loop performed in operation S161 is larger than a specific depth. Here, the specific depth may be set to a minimum depth at which features accumulated by execution of the convolution loop are meaningful. If the current convolution depth is larger than the specific depth (Yes), the process proceeds to operation S163. If the current convolution depth is not larger than the specific depth (No), the process proceeds to operation S161.

In operation S162', the controller 190 may determine whether a depth of the convolution loop performed in operation S161 is included in a specific range. Here, the specific range from "A" to "B" may be a depth range of a convolution loop that is selected to reduce computational complexity for detecting a max position. Feature values that have a max value may be detected only at a specific depth of the convolution loop. If a depth of the convolution loop performed in operation S161 is not included in the specific range from "A" to "B" (No), the process proceeds to operation S161. If a depth of the convolution loop performed in operation S161 is included in the specific range from "A" to "B" (Yes), the process proceeds to operation S163.

In operation S163, the controller 190 may detect a max value of accumulated features (e.g., output features) generated in the convolution loop of operation S161 and a max position MP at which the max value is detected. Here, the max position MP may be a max value that is detected from among accumulated features generated according to the convolution operation in the one input image 10 or a feature map. Alternatively, the max position MP may be maximum values of accumulated features of respective area units divided in the one input image 10 or the feature map.

In operation S164, the controller 190 may compare the max position Current MP detected in a current convolution loop with a max position Previous MP detected in a previous convolution loop. If the max position Current MP is substantially the same as the max position Previous MP detected in the previous convolution loop (Yes), the process proceeds to operation S166. If the max position Current MP is different from the max position Previous MP (No), the process proceeds to operation S165.

In operation S165, the controller 190 may initialize max position data stored in the max position buffer 195. In other words, a max position may be found. For example, the number of times that a max value is detected at the same position may be "0," and a previous max position may be updated. Afterwards, the process proceeds to operation S161, in which a convolution loop of a next depth for detecting a max position is executed.

In operation S166, the controller 190 may count up the number of times nMP that a max value is detected at a detected position, in the max position buffer 195. That is, the controller 190 may update the number of times that a max value is detected at the same position in a current feature map. For example, "1" may be added to a max value detection count nMP managed in the form of a table in the max position buffer 195.

In operation S168, an operation branch may be created according to whether a max value detection count nMP at the same position exceeds a threshold value TH. For example, if a current max value detection count nMP exceeds the threshold value TH, the controller 190 may determine that a max position is fixed. The size of the threshold value TH may be variously set according to a characteristic of the convolutional neural network system 100. If the max value detection count nMP at the same position exceeds the threshold value TH (Yes), the max position is determined as being fixed, and operation S160c ends. The fixed max position may be stored in the max position buffer 195. If the max value detection count nMP at the same position does not reach the threshold value TH (No), the process proceeds to operation S161, in which a convolution loop for detecting an additional max position is executed. Here, it may be well understood that the threshold value TH is replaced with a specific ratio of the whole convolution depth (e.g., maximum convolution depth), which indicates a ratio of the max value detection count nMP indicating the number of loops in which a max value is detected.

Another example embodiment for detecting a max position is described above. Since an operation for detecting a max position is activated in the specific depth range from "A" to "B," a user may variously adjust a detection condition based on an operation condition of the convolutional neural network system 100 or a kind of input image.

Figure 11:
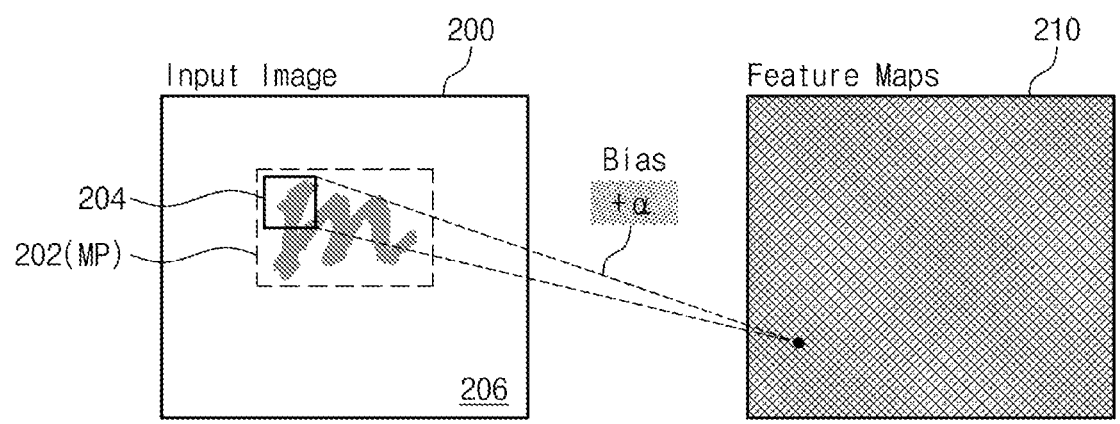
FIG. 11 is a view illustrating another example embodiment in which a max position of the inventive concept is used.

FIG. 11 is a view illustrating another example embodiment in which a max position of the inventive concept is used. Referring to FIG. 11, after the max position MP is detected, the convolution operation may be performed only on an area of an input image 200 or an input feature map, which corresponds to the max position MP. In addition, bias addition applied to a result value of the convolution operation may be also applied to only the max position MP.

The input image 200 may be one of a plurality of image data layers that constitute an input original image. Alternatively, the input image 200 may be a feature map produced through a previous convolution operation. It is assumed that a max position detected through a max detection operation is a max area (MP) 202. In this case, after a max value is detected, a convolution loop may be performed only in the max area 202. That is, a plurality of kernels may be shifted in the max area 202, and parameters of an overlapping area may be multiplied and accumulated. However, the convolution operation of an invalid area 206 of the input image 200, which corresponds to the outside of the max area 202, may be skipped. A feature value of the invalid area 206 may be set to "0" or a fixed specific level.

As illustrated in FIG. 11, any one kernel 204 may overlap with the input image 200 in the max area 202 for the convolution operation. Image data values and kernel weighted values of the overlapping area may be multiplied. One feature value may be output as a result of adding the multiplied values. However, "0" may be output as a feature value of the invalid area except for the max area 202. In this case, a bias value a is added to a feature produced as the result of the convolution operation. According to an aspect of an exemplary embodiment, an output feature map 210 may be produced under a condition that the convolution operation and the addition of the bias value a are applied to only the max area 202. That is, the convolution operation and the bias addition operation associated with the invalid area 206 of the input image 200 may be skipped.

It may be possible to markedly reduce computational complexity of a convolution loop to be applied after a max position is detected through applying of the convolution operation to the max area 202 and the bias addition.

Figure 12:
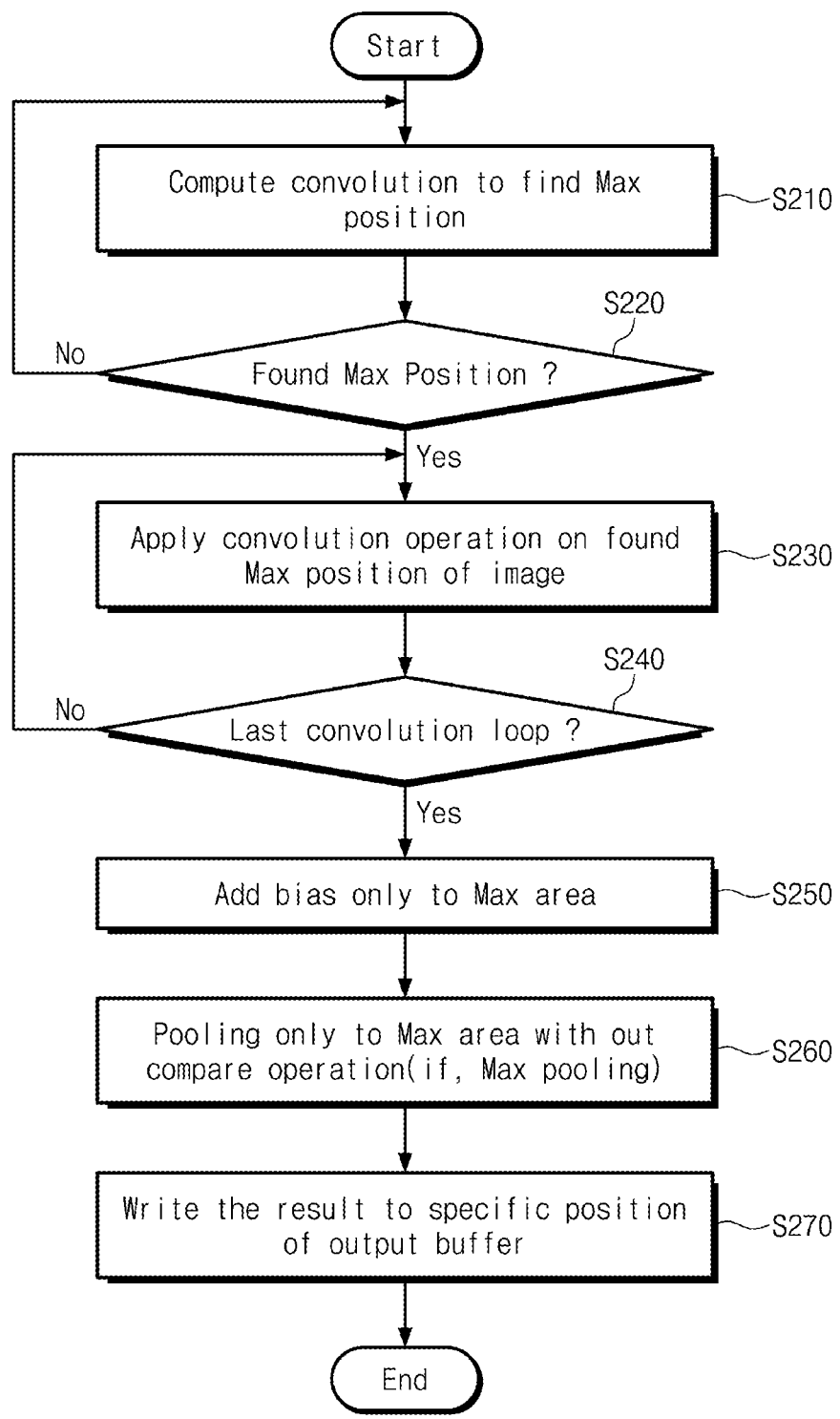
FIG. 12 is a flowchart illustrating another example embodiment in which a max position of the inventive concept is used.

FIG. 12 is a flowchart illustrating another example embodiment in which a max position of the inventive concept is used. Referring to FIG. 12, if the max position MP is detected, the controller 190 (refer to FIG. 1) may store max position data in the max position buffer 195. Afterwards, the convolution operation may be performed based on the max position data stored in the max position buffer 195. In addition, the controller 190 may perform a down-sampling operation on a feature map produced in a convolution loop by using the max position data stored in the max position buffer 195.

In operation S210, the convolution operation with a kernel for detecting a max position of a feature value may be executed. For the convolution operation, the controller 190 may control the input buffer 110, the processing element unit 130, the parameter buffer 150, and the output buffer 170 such that the convolution loop for determining the max position is executed. The controller 190 may produce a plurality of feature maps through execution of one convolution loop.

In operation S220, the controller 190 may detect a max value of feature values included in the feature map. The controller 190 may compare a max position of feature values accumulated in a previous convolution loop and a max position produced in a current convolution loop. A method of determining a max position is in detail described with reference to the flowcharts of FIGS. 8 to 10, and a description thereof is thus omitted. If it is determined that the max position is detected (Yes), max position data may be recorded in the max position buffer 195. Afterwards, the process proceeds to operation S230. If it is determined that the max position is not detected (No), the process proceeds to operation S210.

In operation S230, convolution loops after detection of a max value may be followed up. That is, the controller 190 may control the input buffer 110, the processing element unit 130, the parameter buffer 150, and the output buffer 170 such that only image data or a feature map area of the max area 202 (refer to FIG. 1), which the detected max position MP indicates, is processed through the convolution operation using a kernel.

In operation S240, whether a convolution loop executed in operation S230 is the last convolution loop for processing the input image 10 or the feature map may be checked. If the convolution loop performed in operation S230 is the last loop (Yes), the process proceeds to operation S250. If the convolution loop performed in operation S230 is not the last loop (No), the process proceeds to operation S230.

In operation S250, a bias applying operation may be performed. That is, a bias α may be added to feature values (e.g., output feature values) produced according to execution of the last convolution loop. However, the bias α may be selectively added only to feature values corresponding to the max position MP. In contrast, bias addition of an area that is not associated with the max position may be skipped.

In operation S260, the pooling or down-sampling operation may be performed. The controller 190 may perform the pooling operation with reference to max position data stored in the max position buffer 195. For example, in the case where the max pooling is used, the controller 190 may transmit a max value feature to the output buffer 170 with reference to the max position stored in the max position buffer 195, without applying a pooling filter. Accordingly, a comparison operation for the max pooling may be unnecessary. In the case where the average pooling is applied for the down-sampling, the pooling operation may be performed in a way to select features corresponding to a max area and obtain an average value. As well as the above-described average pooling, various methods for performing a pooling operation may be provided. For example, the pooling operation may be additionally executed by applying a way to rank values of a pooling filter, a way to select a median, etc.

In operation S270, in the case where the max pooling is applied, the result may be written in the output buffer 170 with reference to a max position stored in the max position buffer 195, without a comparison operation on a max value feature.

A method of using a max position of features produced in a convolution layer is briefly described above. As a convolution depth is deep, a max position of features produced as an execution result of a convolution loop may be fixed. If the max position is detected using a characteristic of the convolution layer, a convolution operation of an image area except for a max value may be skipped. Accordingly, it may be possible to markedly reduce computational complexity needed for a convolution operation including multiplication and accumulation operations.

According to one or more example embodiments, there is provided a convolutional neural network system capable of reducing the number of times that a convolution loop for determining correlation with a kernel is executed. Accordingly, the convolutional neural network system according to one or more example embodiments may markedly reduce computational complexity needed for the convolution operation. This may mean that power needed to drive the convolutional neural network system is reduced.

While various example embodiments have been described, it will be apparent to those skilled in the art that various changes and modifications may be made without departing from the spirit and scope of the present disclosure. Therefore, it should be understood that the above example embodiments are not limiting, but illustrative.

What is claimed is:

1. A method of operating a convolutional neural network system, the method comprising:
    executing convolution loops to determine a correlation between at least one kernel and an input feature map;
    determining a maximum position on the input feature map, the maximum position corresponding to a maximum value of an output feature produced based on the convolution loops; and
    processing first data of a first area of the input feature map through a convolution loop using the at least one kernel, the first area being associated with the maximum position,
    wherein the processing of the first data comprises skipping a convolution operation of second data of a second area of the input feature map, the second area being unassociated with the maximum position.

2. The method of claim 1, wherein the determining of the maximum position comprises, in response to the maximum value being successively detected by at least a reference number of times at one position on the input feature map, determining the one position as the maximum position.

3. The method of claim 1, wherein the determining of the maximum position comprises, in response to a number of times that the maximum value is successively detected at one position on the input feature map being greater than or equal to a reference ratio to a maximum convolution depth, determining the one position as the maximum position.

4. The method of claim 1, wherein the executing the convolution loops comprises performing the convolution loops in a depth interval of a specific range of a maximum convolution depth.

5. The method of claim 1, wherein the maximum position is stored in a form of probability information during a training operation of the convolutional neural network system.

6. The method of claim 1, wherein the determining the maximum position comprises setting a position on the input feature map, the position corresponding to the maximum value being input by a user.

7. The method of claim 1, further comprising selectively applying a bias to output feature values produced according to execution of the convolution loop of the processing of the first data.

8. The method of claim 7, wherein the selectively applying the bias comprises applying the bias to a first output feature value corresponding to the maximum position and is not applied to a second output feature value that is not associated with the maximum position.

9. The method of claim 1, further comprising:
    performing a pooling operation for reducing sizes of output feature maps to be output after the processing of the first data.

10. The method of claim 9, wherein the pooling operation comprises transmitting features, which correspond to the maximum position, from among features of the output feature maps to an output buffer.

11. The method of claim 10, wherein a comparison operation between features selected in the pooling operation is skipped.

12. A convolutional neural network system comprising:
    an input buffer configured to buffer at least one of an input image or an input feature map;
    a processing element unit configured to perform a convolution operation using the at least one of the input image and the input feature map from the input buffer and at least one kernel;
    an output buffer configured to store output features that are output as a result of the convolution operation performed by the processing element unit;
    a controller configured to control the input buffer, the processing element unit, and the output buffer to:
        execute convolution loops to determine a correlation between the at least one kernel and the input feature map;
        detect a maximum position on the input feature map, the maximum position corresponding to a maximum value of the output features that are produced based on the convolution loops;
        process first data of a first area of the input feature map through a convolution loop using the at least one kernel, the first area being associated with the maximum positions; and
        skip a convolution operation of second data of a second area of the input feature map, the second area being unassociated with the maximum position; and
    a maximum position buffer configured to store the maximum position.

13. The convolutional neural network system of claim 12, wherein the controller is further configured to, in response to the maximum value being successively detected by at least a reference number of times at one position on the input feature map, determine the one position as the maximum position and store the maximum position in the maximum position buffer.

14. The convolutional neural network system of claim 12, wherein the controller is further configured to, in response to the maximum value being successively detected at one position on the input feature map by a reference ratio or greater with regard to a maximum convolution depth, determine the one position as the maximum position and store the maximum position in the maximum position buffer.

15. The convolutional neural network system of claim 12, wherein the controller is further configured to add a bias to an output feature value corresponding to the maximum position.

16. The convolutional neural network system of claim 15, wherein the bias is added to the output feature value corresponding to the maximum position and is not applied to an output feature value unassociated with the maximum position.

17. The convolutional neural network system of claim 12, wherein the controller is further configured to:

perform a pooling operation for down-sampling the output features, and transmit features, which correspond to the maximum position, from among the output features to the output buffer without a comparison operation.

18. The convolutional neural network system of claim 12, further comprising:

a parameter buffer configured to provide a weighted value and size information of the at least one kernel to the processing element unit.

19. A method comprising:

determining a maximum position of an input feature map, wherein a position of the input feature map corresponding to a maximum value of an output feature produced via convolution loops converges to the maximum position;

performing a convolution loop only on a first area of the input feature map corresponding to the maximum position to produce an output feature map, while skipping performance of the convolution loop over a second area of the input feature map that does not correspond to the maximum position; and storing the maximum position.

\* \* \* \* \*